(12) United States Patent
Krahn (10) Patent No.: US 10,435,064 B2
(45) Date of Patent: Oct. 8, 2019

(54) LOAD-REACTION SWITCHING VALVE ASSEMBLY

(71) Applicant: EATON CORPORATION, Cleveland, OH (US)

(72) Inventor: Aaron Kelly Krahn, Eden Prairie, MN (US)

(73) Assignee: EATON INTELLIGENT POWER, LTD., Dublin (IE)

(*) Notice: Subject to any disclaimer, the term of this patent is extended or adjusted under 35 U.S.C. 154(b) by 431 days.

(21) Appl. No.: 15/123,159

(22) PCT Filed: Mar. 5, 2015

(86) PCT No.: PCT/US2015/018879
§ 371 (c)(1),
(2) Date: Sep. 1, 2016

(87) PCT Pub. No.: WO2015/134706
PCT Pub. Date: Sep. 11, 2015

(65) Prior Publication Data
US 2017/0072998 A1    Mar. 16, 2017

Related U.S. Application Data

(60) Provisional application No. 61/948,976, filed on Mar. 6, 2014.

(51) Int. Cl.
*B62D 5/09* (2006.01)
*B62D 5/093* (2006.01)
(Continued)

(52) U.S. Cl.
CPC .............. *B62D 5/093* (2013.01); *B62D 1/22* (2013.01); *B62D 5/04* (2013.01); *B62D 5/062* (2013.01); *B62D 5/09* (2013.01)

(58) Field of Classification Search
CPC .. F15B 9/08; B62D 5/09; B62D 5/093; B62D 1/22; B62D 1/286
See application file for complete search history.

(56) References Cited

U.S. PATENT DOCUMENTS

| 4,016,949 A | 4/1977 | Plate et al. |
| 7,984,785 B2 | 7/2011 | Cadman et al. |
| (Continued) | | |

FOREIGN PATENT DOCUMENTS

WO    WO2013/097925 A1    7/2013

OTHER PUBLICATIONS

(PCT/US2015/018879 Filed March 5, 2015) International Search Report and Written Opinion of the ISA dated Jun. 18, 2015, 12 Pages.

*Primary Examiner* — Joseph M Rocca
*Assistant Examiner* — Daniel S Yeagley
(74) *Attorney, Agent, or Firm* — Bradley J. Diedrich; Jarat D. Millar (57) ABSTRACT

A steering system for a vehicle includes a fluid pump, an actuator in selective fluid communication with the fluid pump, a hydrostatic steering system and an electro-hydraulic steering system. The hydrostatic steering system includes a fluid controller having a first proportional valve in fluid communication with the fluid pump and a fluid meter in fluid communication with the first proportional valve and the actuator. The electro-hydraulic steering system includes a second proportional valve in selective fluid communication with the fluid pump and the actuator. The second proportional valve is disposed in parallel to the first proportional valve. The electro-hydraulic steering circuit further includes a load-reaction switching valve assembly disposed in series with the first proportional valve of the hydrostatic steering system. The load-reaction switching valve allows fluid com- (Continued)

munication between the actuator and the fluid controller when the first proportional valve is in a neutral position.

14 Claims, 6 Drawing Sheets

(51) Int. Cl.
*B62D 1/22* (2006.01)
*B62D 5/04* (2006.01)
*B62D 5/06* (2006.01)

(56) References Cited

U.S. PATENT DOCUMENTS

| | | |
|---|---|---|
| 2005/0205337 A1 | 9/2005 | Porskrog et al. |
| 2009/0272598 A1 | 11/2009 | Gehlhoff |
| 2013/0087209 A1* | 4/2013 | Krahn .................. F15B 9/08 137/2 |

* cited by examiner

LOAD-REACTION SWITCHING VALVE ASSEMBLY

CROSS REFERENCE TO RELATED APPLICATION

This application is being filed on 5 Mar. 2015 as a PCT International Patent Application and claims priority to U.S. patent application Ser. No. 61/948,976 filed on 6 Mar. 2014, the disclosure of which is hereby incorporated herein by reference in its entirety.

BACKGROUND

In many "off-highway" vehicles, such as tractors, loaders, line painting vehicles, sweepers, pavers, marine vehicles, etc., parallel steering circuits are used to control an actuator that steers the vehicle. In some applications, one of the parallel steering circuits is manually actuated using a steering wheel and another is actuated through an automation system.

SUMMARY

One aspect of the present disclosure relates to a steering system for a vehicle. The steering system includes a fluid pump, an actuator in selective fluid communication with the fluid pump, a hydrostatic steering system and an electro-hydraulic steering system. The hydrostatic steering system includes a fluid controller having a first proportional valve in fluid communication with the fluid pump and a fluid meter in fluid communication with the first proportional valve and the actuator. The electro-hydraulic steering system includes a second proportional valve in fluid communication with the fluid pump and the actuator. The second proportional valve is disposed in parallel to the first proportional valve. The steering circuit further includes a load-reaction switching valve assembly disposed in series with the first proportional valve of the hydrostatic steering system. The load-reaction switching valve allows fluid communication between the actuator and the fluid controller when the first proportional valve is in a neutral position.

Another aspect of the present disclosure relates to a steering system for a vehicle. The steering system includes a fluid pump, an actuator in selective fluid communication with the fluid pump, a hydrostatic steering system and an electro-hydraulic steering system. The hydrostatic steering system includes a fluid controller defining a fluid inlet port in fluid communication with the fluid pump, a fluid outlet, a first control port and a second control port. The first and second control ports are in fluid communication with the actuator. The fluid controller includes a first proportional valve in fluid communication with the fluid pump and a fluid meter in fluid communication with the first proportional valve and the actuator. The electro-hydraulic steering system includes a second proportional valve in fluid communication with the fluid pump and the actuator. The second proportional valve is disposed in parallel to the first proportional valve. The steering circuit further includes a load-reaction switching valve assembly disposed in series with the first proportional valve of the hydrostatic steering system. The load-reaction switching valve assembly includes a housing having a first end and an oppositely disposed second end. The housing defines a bore, a first control passage in fluid communication with the first control port of the fluid controller, a second control passage in fluid communication with the second control port of the fluid controller and a pilot passage. A first check valve is disposed in the bore adjacent to the first end of the housing. A second check valve is disposed in the bore adjacent to the second end of the housing. A first piston is disposed in the bore between the first and second check valves. A second piston is disposed in the bore between the first piston and the second check valve.

Another aspect of the present disclosure relates to a load-reaction switching valve assembly. The load-reaction switching valve assembly includes a housing having a first end and an oppositely disposed second end. The housing defines a bore, a first control passage in fluid communication with the first control port of the fluid controller, a second control passage in fluid communication with the second control port of the fluid controller and a pilot passage. A first check valve is disposed in the bore adjacent to the first end of the housing. A second check valve is disposed in the bore adjacent to the second end of the housing. A first piston is disposed in the bore between the first and second check valves. A second piston is disposed in the bore between the first piston and the second check valve.

Another aspect of the present disclosure relates to a load-reaction switching valve assembly. The load-reaction switching valve assembly includes a housing having a first end and an oppositely disposed second end. The housing defines a bore, a first control passage in fluid communication with the first control port of the fluid controller, a second control passage in fluid communication with the second control port of the fluid controller and a pilot passage. A first check valve is disposed in the bore adjacent to the first end of the housing. A second check valve is disposed in the bore adjacent to the second end of the housing. A first piston is disposed in the bore between the first and second check valves. A second piston is disposed in the bore between the first piston and the second check valve. The first and second pistons are actuated between a first position in which pressurized fluid in the first control passage unseats the first check valve and acts against the first piston so that the first piston abuts the second piston to unseat the second check valve, a second position in which pressurized fluid in the second control passage unseats the second check valve and acts against the second piston so that the second piston abuts the first piston to unseat the first check valve, and third position in which pressurized fluid in the pilot passage acts against the first piston to unseat the first check valve and the second piston to unseat the second check valve.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Reference will now be made in detail to the exemplary aspects of the present disclosure that are illustrated in the accompanying drawings. Wherever possible, the same reference numbers will be used throughout the drawings to refer to the same or like structure.

Figure 1:
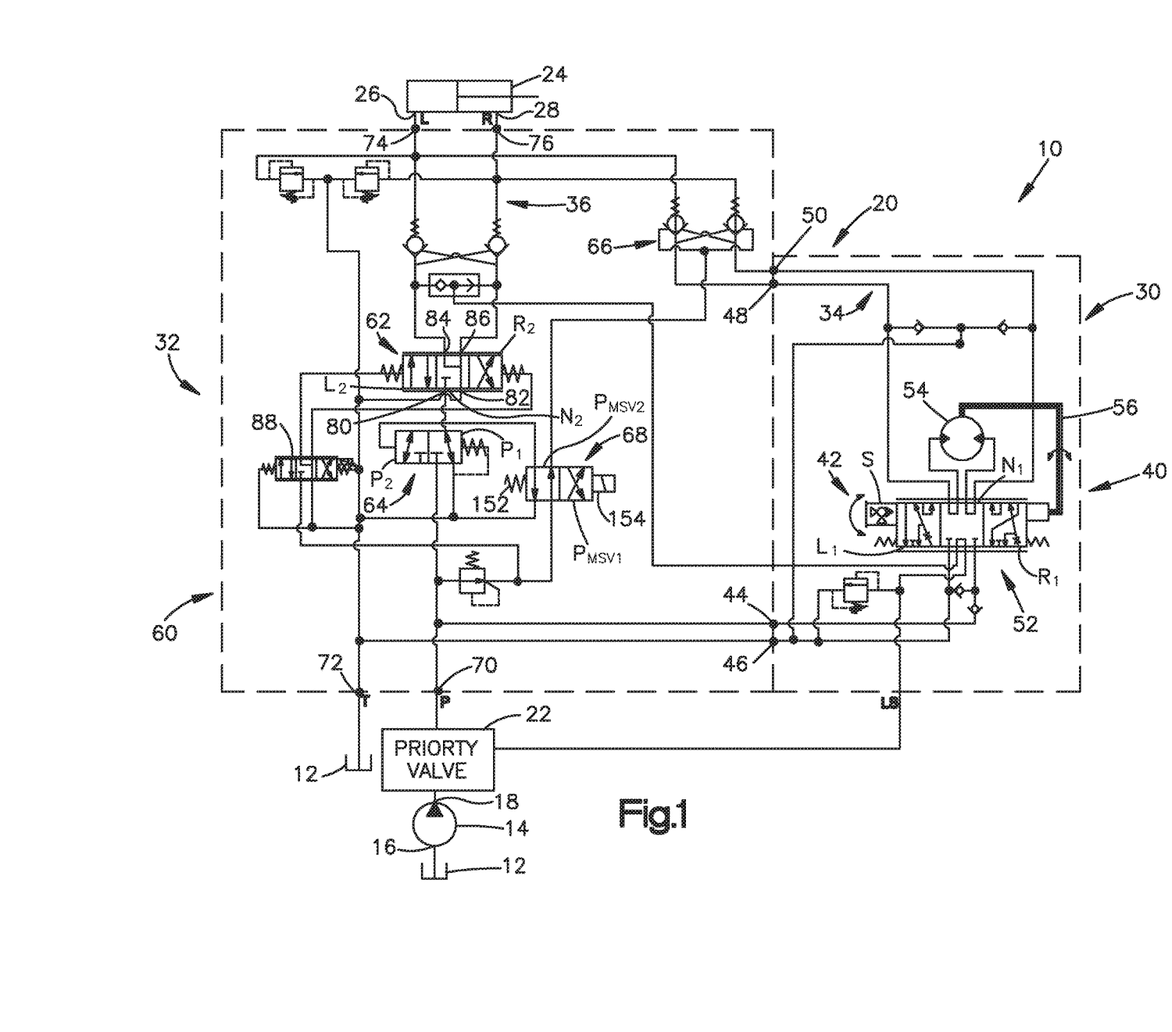
FIG. 1 is a hydraulic schematic of a steering circuit having exemplary features of aspects in accordance with the principles of the present disclosure.

Referring now to FIG. 1, a schematic representation of a steering system 10 for a vehicle is shown. The steering system 10 includes a reservoir 12 and a fluid pump 14 having an inlet 16 in fluid communication with the reservoir 12 and an outlet 18. The steering system 10 further includes a steering circuit 20 in fluid communication with the outlet 18 of the fluid pump 14. In the depicted embodiment, the steering system 10 includes a priority valve 22 in fluid communication with the fluid pump 14 and the steering circuit 20.

The steering circuit 20 provides selective fluid communication between the fluid pump 14 and an actuator 24. In the depicted embodiment, the actuator 24 is shown as a cylinder having a first port 26 disposed on one end of the actuator 24 and a second port 28 disposed on an opposite end of the actuator 26. In other embodiments, the actuator 24 is a fluid motor.

The steering circuit 20 includes a hydrostatic steering circuit 30 and an electro-hydraulic steering circuit 32. The hydrostatic steering circuit 30 defines a first flow path 34 between the fluid pump 14 and the actuator 24. The electro-hydraulic steering circuit 32 defines a second flow path 36 between the fluid pump 14 and the actuator 24. The first flow path 34 of the hydrostatic steering circuit 30 is disposed in a parallel to the second flow path 36 of the electro-hydraulic steering circuit 32.

In the depicted embodiment, the load-sense priority valve 22 is disposed between the fluid pump 14 and the steering circuit 20. The load-sense priority valve 22 selectively apportions fluid from the pump 14 between the hydrostatic steering circuit 30 and the electro-hydraulic steering circuit 32.

Referring still to FIG. 1, the hydrostatic steering circuit 30 will be described. The hydrostatic steering circuit 30 is disposed in parallel to the electro-hydraulic steering circuit 32. The hydrostatic steering circuit 30 includes a fluid controller 40. The fluid controller 40 includes a first proportional valve 42 and defines a fluid inlet port 44 in fluid communication with the outlet 18 of the fluid pump 14, a fluid outlet port 46 in fluid communication with the reservoir 12, a first control port 48 in fluid communication with the first port 26 of the actuator 24, and a second control port 50 in fluid communication with the second port 28 of the actuator 24. The first proportional valve 42 is disposed between the fluid inlet port 44 and the first and second control ports 48, 50.

In the depicted embodiment, the first proportional valve 42 of the fluid controller 40 includes a valving assembly 52. In one embodiment, the valving assembly 52 includes a rotary valve (e.g., a spool valve) and a follow-up valve member (e.g., a sleeve). In the depicted embodiment, the rotary valve rotates within a bore of the follow-up valve member as a result of manual actuation of a steering actuation member S (e.g., a steering wheel, a joystick, etc.).

The first proportional valve 42 is moveable from a neutral position $N_1$ to a right turn position $R_1$ or a left turn position $L_1$ through the manual actuation of the steering actuation member S. With the first proportional valve 42 in the right turn position $R_1$ or the left turn position $L_1$, fluid is communicated from the fluid pump 14 to one of the first and second ports 26, 28 of the actuator 24 through a fluid meter 54 (e.g., a gerotor gear set).

In the depicted embodiment, the fluid meter 54 is dual functional. The fluid meter 54 functions as a metering device that measures the proper amount of fluid to be fed to the appropriate control port 48, 50 of the fluid controller 40 in response to rotation of the steering actuation member S. The fluid meter 54 also functions as a follow-up device that provides follow-up movement to the valving assembly 52. In the depicted embodiment, the follow-up movement is achieved by a mechanical link 56 (e.g., a drive, etc.) that connects the fluid meter 54 to the valving assembly 52.

Referring still to FIG. 1, the electro-hydraulic steering circuit 32 will be described. The electro-hydraulic steering circuit 32 includes an electro-hydraulic valve assembly 60. In the depicted embodiment, the electro-hydraulic valve assembly 60 includes a second proportional valve 62, an isolation valve 64, a load-reaction switching valve assembly 66, and a mode selection valve 68. The electro-hydraulic valve assembly 60 is disposed in the second flow path 36.

The electro-hydraulic valve assembly 60 includes a fluid inlet 70, a fluid outlet 72, a first actuator outlet 74 and a second actuator outlet 76. The fluid inlet 70 is in fluid communication with the fluid pump 14. The fluid outlet 72 is in fluid communication with the reservoir 12. The first and second actuator outlets 74, 76 are in fluid communication with the first and second ports 26, 28, respectively, of the actuator 24.

The second proportional valve 62 of the electro-hydraulic steering circuit 32 is disposed between the fluid inlet 70 and the first and second actuator outlets 74, 76. The second proportional valve 62 includes an inlet 80 in selective fluid communication with the fluid pump 14, a return 82 in selective fluid communication with the reservoir 12, a first outlet 84 in selective fluid communication with the first actuator outlet 74, and a second outlet 86 in selective fluid communication with the second actuator outlet 76.

In the depicted embodiment, the second proportional valve 62 is a three-position valve. In the depicted embodiment, the second proportional valve 62 includes a neutral position $N_2$, a right turn position $R_2$ and a left turn position $L_2$. In the depicted embodiment, the neutral position $N_2$ blocks fluid communication between the fluid inlet 70 and the first and second actuator outlets 74, 76.

Figure 2:
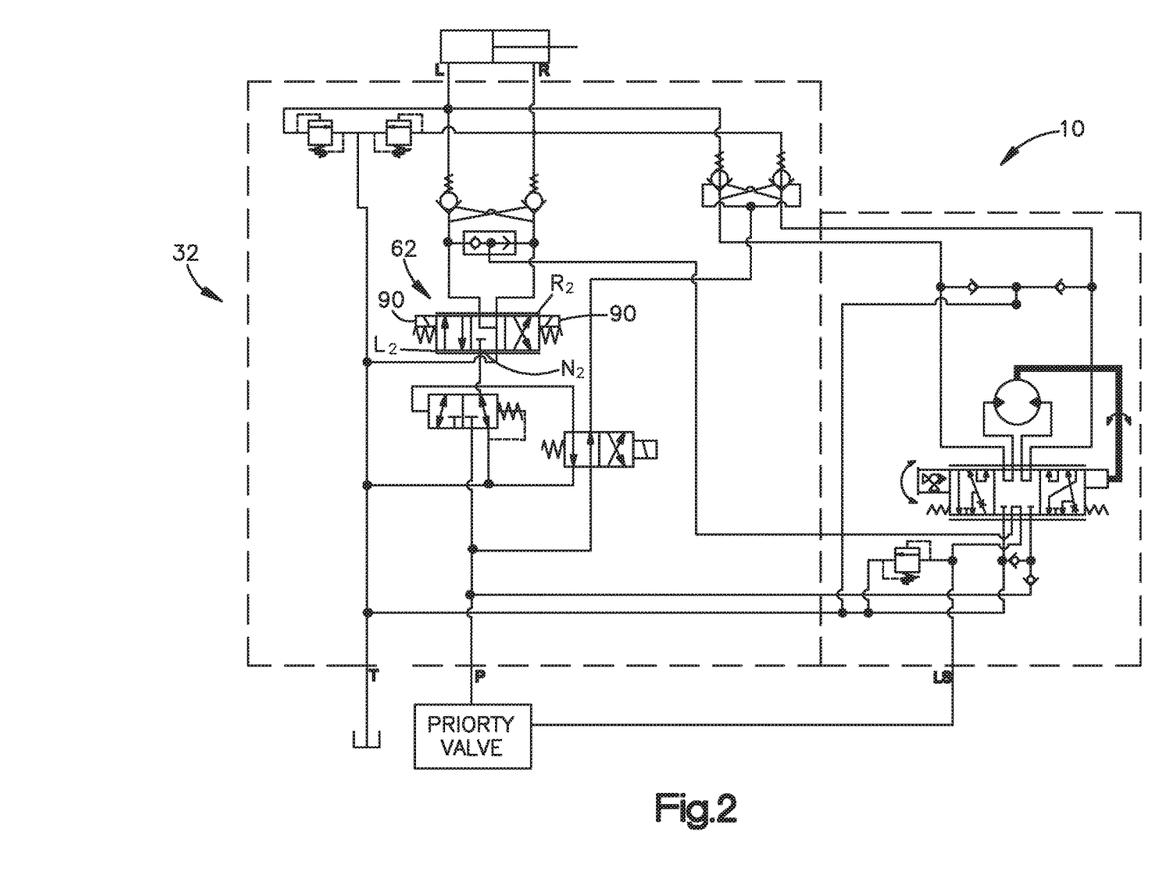
FIG. 2 is an alternate embodiment of the hydraulic schematic of FIG. 1.

In the depicted embodiment of FIG. 1, the second proportional valve 62 is hydraulically actuated between the neutral, left and right turn positions $N_2$, $L_2$, $R_2$. A pilot pressure control valve 88 actuates the second proportional valve 62 between the neutral, left and right turn positions $N_2$, $L_2$, $R_2$. In an alternate embodiment shown in FIG. 2, the second proportional valve 62 of the electro-hydraulic steering circuit 32 is electrically actuated between the neutral, left and right turn positions $N_2$, $L_2$, $R_2$. In the depicted embodiment of FIG. 2, the second proportional valve 62 is actuated by a solenoid 90.

Referring still to FIG. 1, the isolation valve 64 of the electro-hydraulic steering circuit 32 is disposed between the fluid pump 14 and the second proportional valve 62. The isolation valve 64 of the electro-hydraulic steering circuit 32 includes a first position $P_1$ and a second position $P_2$. In the first position $P_1$, fluid communication between the fluid pump 14 and the second proportional valve 62 is blocked. In the first position $P_1$, the inlet 80 of the second proportional valve 62 is in fluid communication with the reservoir 12. In the second position $P_2$, the inlet 80 of the second proportional valve 62 is in fluid communication with the fluid pump 14.

Figure 3:
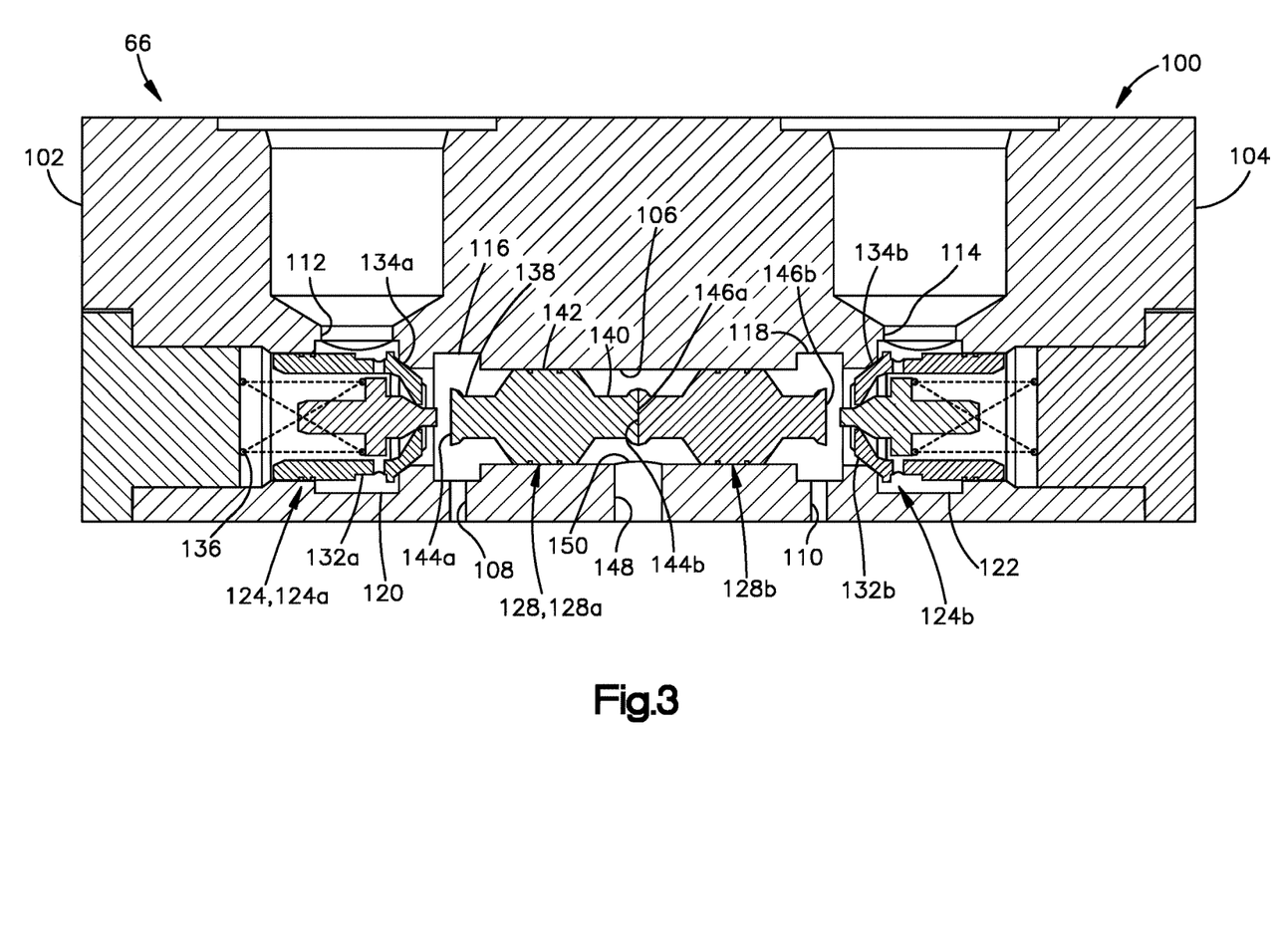
FIG. 3 is cross-sectional view of a load-reaction switching valve assembly suitable for use in the steering circuit of FIG. 1.

Referring now to FIGS. 1 and 3, the load-reaction switching valve assembly 66 will be described. The load-reaction switching valve assembly 66 enables or disables a load-reaction feature of the hydrostatic steering circuit 30. The load-reaction feature is a feature in which the first and second control ports 48, 50 of the fluid controller 40 are in fluid communication with the fluid meter 54 when the first proportional valve 42 is in the neutral position $N_1$. This allows a vehicle operator to feel movement of the actuator through the steering actuation member S when the first proportional valve 42 is in the neutral position $N_1$.

The load-reaction switching valve assembly 66 is disposed in series with the first proportional valve 42 of the hydrostatic steering circuit 30. The load-reaction switching valve assembly 66 is disposed in the first flow path 34 of the steering system 10.

The load-reaction switching valve assembly 66 includes a housing 100. The housing 100 includes a first end 102 and an oppositely disposed second end 104. The housing 100 defines a bore 106 that extends through the first and second ends 102, 104. The housing 100 further defines a first control passage 108 in fluid communication with the first control port 48 of the fluid controller 40, a second control passage 110 in fluid communication with the second control port 50 of the fluid controller 40, a first actuator passage 112 in fluid communication with the first port 26 of the actuator 24, and a second actuator passage 114 in fluid communication with the second port 28 of the actuator 24.

The bore 106 includes a first control opening 116 that is in fluid communication with the first control passage 108, a second control opening 118 that is in fluid communication with the second control passage 110, a first actuator opening 120 that is in fluid communication with the first actuator passage 112 and a second actuator opening 122 that is in fluid communication with the second actuator passage 114. In the depicted embodiment, each of the openings 116, 118, 120, 122 is an annular groove in the bore 106. In the depicted embodiment, the first control opening 116 is disposed between the first and second actuator openings 120, 122 while the second control opening 118 is disposed between the first control opening 116 and the second actuator opening 122.

The load-reaction switching valve assembly 66 includes a first check valve 124a, a second check valve 124b, a first piston 128a and a second piston 128b. The first check valve 124a is disposed in the bore 106 of the housing 100 adjacent to the first end 102. The second check valve 124b is disposed in the bore 106 of the housing 100 adjacent the second end 104. The first check valve 124a is adapted to provide selective fluid communication between the first control passage 108 and the first actuator passage 112. The second check valve 124b is adapted to provide selective fluid communication between the second control passage 110 and the second actuator passage 114.

In the depicted embodiment, the first and second check valves 124a, 124b are substantially similar. For clarification purposes only, reference numerals of common features associated specifically with the first check valve 124a will be followed by the letter "a" while reference numerals of common features associated specifically with the second check valve 124b will be followed by the letter "b." When common features are generally referenced, however, the reference numeral will not be followed by any letters.

Each of the first and second check valves 124a, 124b includes a poppet 132 and a valve seat 134. The poppet 132 is biased by a spring 136 to a seated position in the valve seat 134 so that fluid flowing in a direction from the actuator 24 to the fluid controller 42 is blocked. With the poppet 132 in the seated position, the load-reaction feature of the hydrostatic steering circuit 30 is disabled.

The first and second pistons 128a, 128b are disposed in the bore 106 of the housing 100 between the first and second check valves 124a, 124b. In the depicted embodiment, the first and second pistons 128a, 128b are substantially similar. For clarification purposes only, reference numerals of common features associated specifically with the first piston 128a will be followed by the letter "a" while reference numerals of common features associated specifically with the second piston 128b will be followed by the letter "b." When common features are generally referenced, however, the reference numeral will not be followed by any letters.

In the depicted embodiment, each of the first and second pistons 128a, 128b is generally cylindrical in shape. Each of the pistons 128 includes a first end portion 138, an oppositely disposed second end portion 140 and a central portion 142. In the depicted embodiment, the first and second end portions 138, 140 have an outer diameter that is less than an outer diameter of the central portion 142. The first end portion 138 includes a first axial end 144. The second end portion 140 includes a second axial end 146.

In the depicted embodiment, the first piston 128a is disposed in the bore 106 so that the first axial end 144a of the first piston 128a is adjacent to the poppet 132a of the first check valve 124a. The second piston 128b is disposed in the bore 106 so that the first axial end 144b of the second piston 128b is disposed adjacent the second axial end 146a of the first piston 128a while the second axial end 146b of the second piston 128b is disposed adjacent to the poppet 132b of the second check valve 124b.

The housing 100 of the load-reaction switching valve assembly 66 further defines a pilot passage 148. In the depicted embodiment, the pilot passage 148 includes a pilot passage opening 150 in the bore 106 that is disposed between the first and second control openings 116, 118. In the depicted embodiment, the pilot passage opening 150 in the bore 106 is centrally disposed between the first and second check valves 124a, 124b.

Referring now to FIG. 1, the mode selection valve 68 will be described. The mode selection valve is adapted to enable or disable the load-reaction feature of the hydrostatic steering circuit 30. The mode selection valve 68 provides selective fluid communication between the fluid pump 14 and the load-reaction switching valve assembly 66. In the depicted embodiment, the mode selection valve 68 provides selective fluid communication between the fluid pump 14 and the pilot passage 148 of the load-reaction switching valve assembly 66.

The mode selection valve 68 is actuated between a first position $P_{MSV1}$ and a second position $P_{MSV2}$. In the first position $P_{MSV1}$, the load-reaction feature of the hydrostatic steering circuit 30 is enabled or active. In the second position $P_{MSV2}$, the load-reaction feature of the hydrostatic steering circuit 30 is disabled or inactive. In the first position $P_{MSV1}$, mode selection valve 68 provides fluid communication between the fluid pump 14 and the pilot passage 148 of the load-reaction switching valve assembly 66. In the second position $P_{MSV2}$, the mode selection valve 68 provides fluid communication between the reservoir 12 and the pilot passage 148 of the load-reaction switching valve assembly 66.

In the depicted embodiment, the mode selection valve 68 is electrically actuated. In the depicted embodiment, the mode selection valve 68 is biased to the first position $P_{MSV1}$ by a spring 152 and actuated to the second position $P_{MSV2}$ by a solenoid 154.

Referring now to FIGS. 1 and 3-6, the operation of the load-reaction switching valve will be described. When the electro-hydraulic steering circuit 32 is active, it is undesirable to have the load-reaction feature active. Otherwise, actuation of the actuator 24 by the electro-hydraulic steering circuit 32 would result in movement of the steering actuation member S of the hydrostatic steering circuit 30. Therefore, when the electro-hydraulic steering circuit 32 is active, a controller sends a signal to the solenoid 154 to actuate the mode selection valve 68 to the second position $P_{MSV2}$. With the mode selection valve 68 in the second position $P_{MSV2}$, fluid in the pilot passage 148 of the load-reaction switching valve assembly 66 is drained to the reservoir 12. With fluid in the pilot passage 148 drained to the reservoir 12, the first and second pistons 128a, 128b of the load-reaction switching valve assembly 66 are centrally disposed in the bore 106 of the housing 100 of the load-reaction switching valve assembly 66 as shown in FIG. 3.

Figure 4:
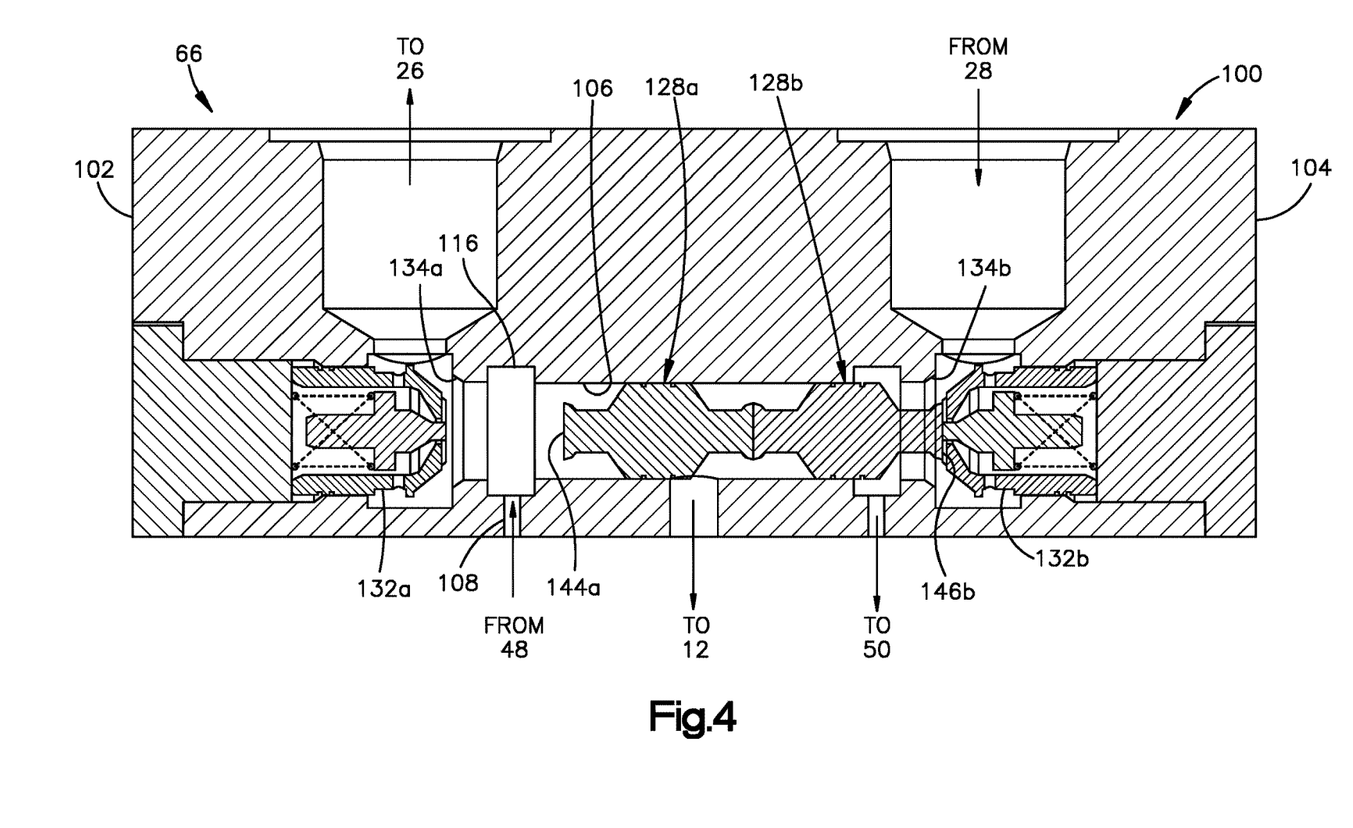
FIG. 4 is the load-reaction switching valve assembly of FIG. 3 shown with a load-reaction feature disabled with a first proportional valve of a hydrostatic steering circuit actuated to a left turn position.

Referring now to FIGS. 1 and 4, if an operator actuates the steering actuation member S of the hydrostatic steering circuit 30 while the electro-hydraulic steering circuit 32 is active so that the first proportional valve 42 of the fluid controller 40 is actuated to the left turn position $L_1$, pressurized fluid from the fluid meter 54 of the fluid controller 40 enters the first control passage 108 of the load-reaction switching valve assembly 66 and actuates the load-reaction switching valve assembly 66 to a first position. The pressurized fluid in the first control passage 108 enters the bore 106 of the housing 100 through the first control opening 116 and acts against the first axial end 144a of the first piston 128a. The pressurized fluid causes the first piston 128a to abut the second piston 128b and moves the first and second pistons 128a, 128b in a direction toward the second end 104 of the housing 100. The second axial end 146b of the second piston 128b abuts the poppet 132b of the second check valve 124b and unseats the poppet 132b from the valve seat 134b. With the poppet 132b unseated from the valve seat 134b, fluid from the second port 28 of the actuator 24 is in fluid communication with the second control port 50 of the fluid controller 40 of the hydrostatic steering circuit 30.

In addition to the first piston 128a, pressurized fluid in the first control passage 108 also acts against the poppet 132a of the first check valve 124a. The pressurized fluid unseats the poppet 132a from the valve seat 134a allowing fluid communication between the first control port 48 of the fluid controller 40 and the first port 26 of the actuator 24. With the electro-hydraulic steering circuit 32 active, the load-reaction switching valve assembly 66 allows the hydrostatic steering circuit 30 to override the electro-hydraulic steering circuit 32 so that the operator can steer the vehicle using the steering actuation member S in the event where a steering correction is required.

With the mode selection valve 68 disposed in the second position, the poppets 132a, 132b of the first and second check valves 124a, 124b are returned to the seated position when the first proportional valve 42 is returned to the neutral position $N_1$.

Figure 5:
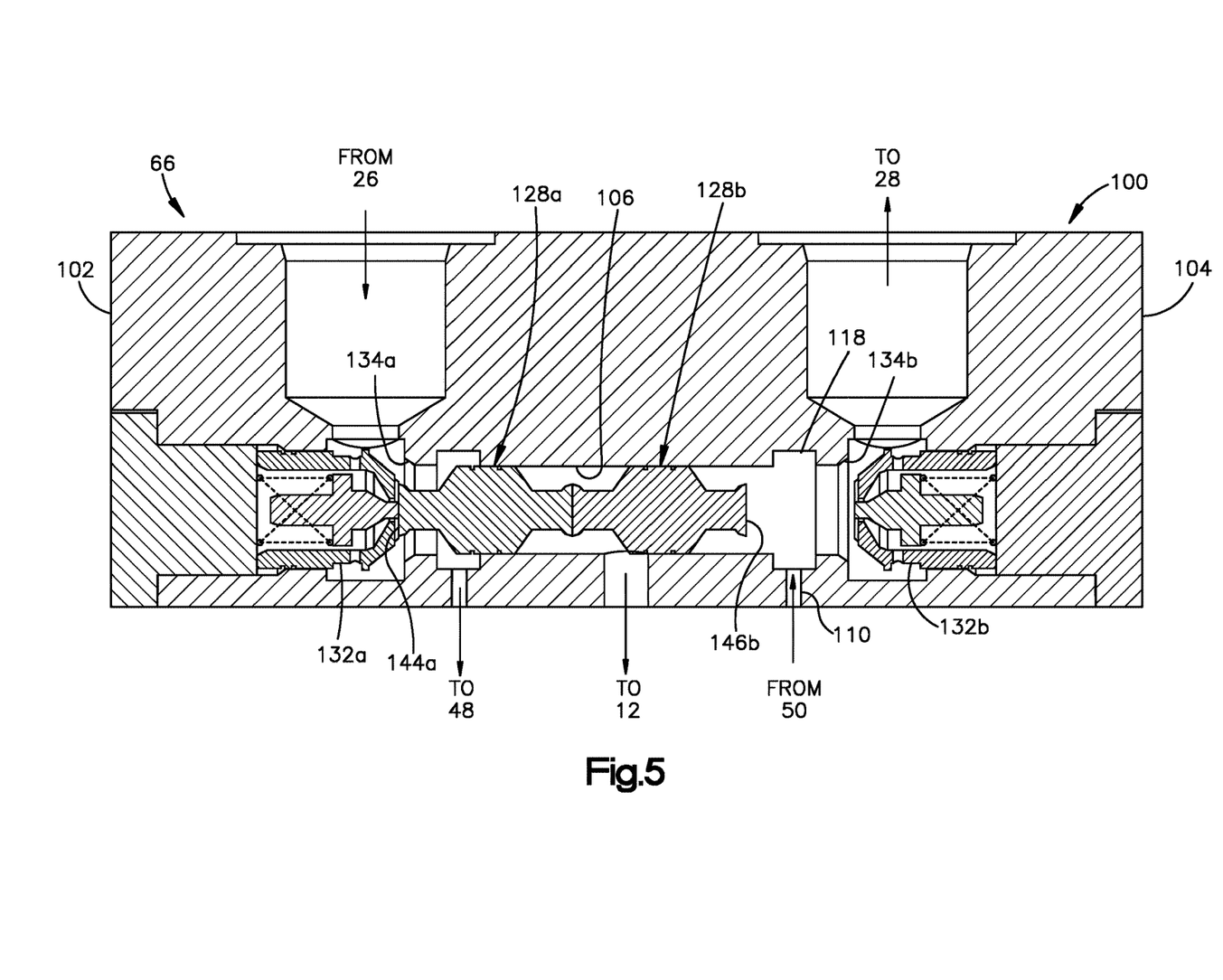
FIG. 5 is the load-reaction switching valve assembly of FIG. 3 shown with the load-reaction feature disabled with the first proportional valve of the hydrostatic steering circuit actuated to a right turn position.

Referring now to FIGS. 1 and 5, if an operator actuates the steering actuation member S of the hydrostatic steering circuit 30 while the electro-hydraulic steering circuit 32 is active so that the first proportional valve 42 of the fluid controller 40 is actuated to the right turn position $R_1$, pressurized fluid from the fluid meter 54 of the fluid controller 40 enters the second control passage 110 of the load-reaction switching valve assembly 66 and actuates the load-reaction switching valve assembly 66 to a second position. The pressurized fluid in the second control passage 110 enters the bore 106 of the housing 100 through the second control opening 118 and acts against the second axial end 146b of the second piston 128b. The pressurized fluid causes the second piston 128b to abut the first piston 128a and moves the first and second pistons 128a, 128b in a direction toward the first end 102 of the housing 100. The first axial end 144a of the first piston 128a abuts the poppet 132a of the first check valve 124a and unseats the poppet 132a from the valve seat 134a. With the poppet 132a unseated from the valve seat 134a, fluid from the first port 26 of the actuator 24 is in fluid communication with the first control port 48 of the fluid controller 40 of the hydrostatic steering circuit 30.

In addition to the second piston 128b, pressurized fluid in the second control passage 110 also acts against the poppet 132b of the second check valve 124b. The pressurized fluid unseats the poppet 132b from the valve seat 134b allowing fluid communication between the second control port 50 of the fluid controller 40 and the second port 28 of the actuator 24.

With the mode selection valve 68 disposed in the second position, the poppets 132a, 132b of the first and second check valves 124a, 124b are returned to the seated position when the first proportional valve 42 is returned to the neutral position $N_1$.

Figure 6:
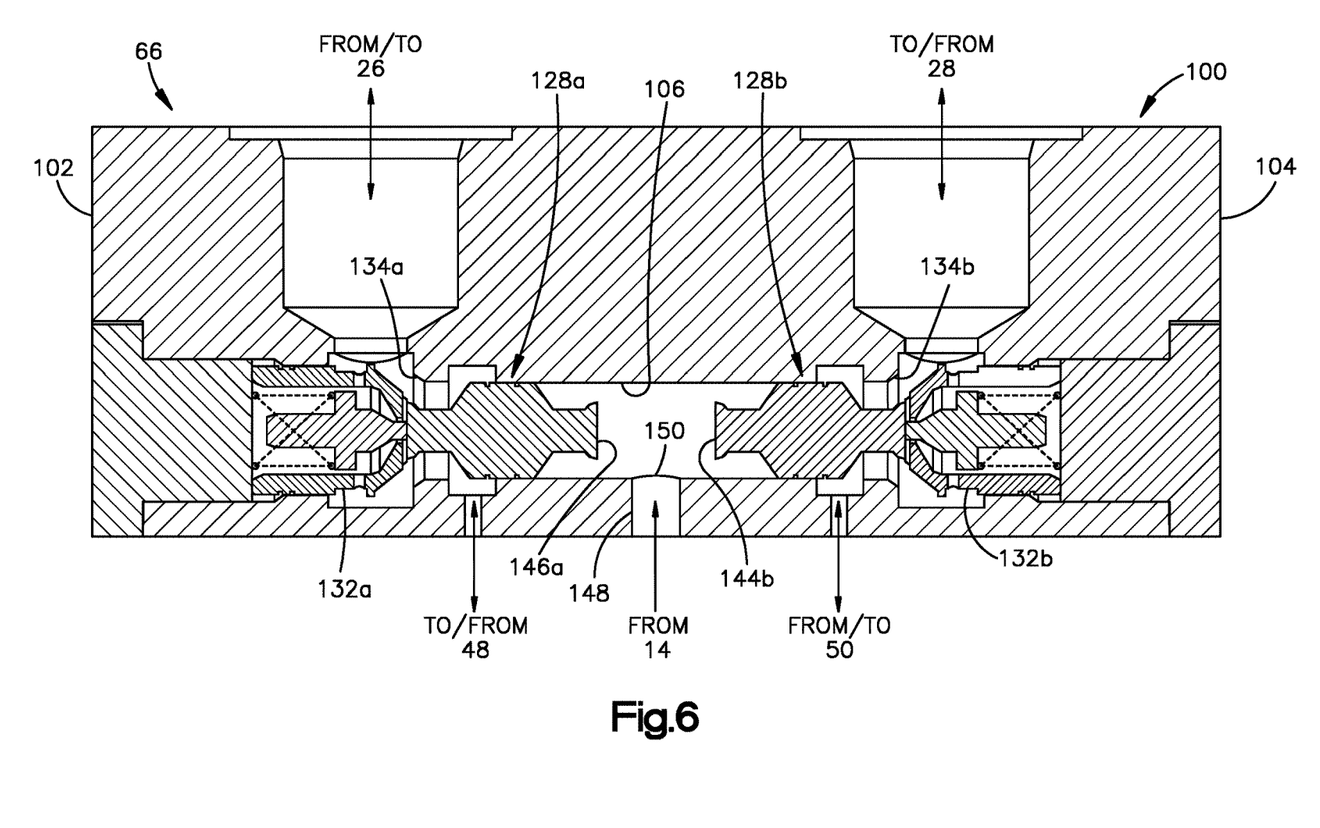
FIG. 6 is the load-reaction switching valve assembly of FIG. 3 shown with the load-reaction feature enabled.

Referring now to FIGS. 1 and 6, a method for enabling the load-reaction feature of the hydrostatic steering circuit 30 will be described. When manual control of the steering system 10 is desired, the mode selection valve 68 is actuated to the second position $P_{MSV2}$. With the mode selection valve 68 in the second position $P_{MSV2}$, the isolation valve 64 is actuated to the first position $P_1$, thereby inactivating the electro-hydraulic steering circuit 32. A portion of fluid from the fluid pump 14 is communicated through the mode selection valve 68 to the pilot passage 148 of the load-reaction switching valve assembly 66. Pressurized fluid in the pilot passage 148 of the load-reaction switching valve assembly 66 actuates the load-reaction switching valve assembly 66 to a third position. The pressurized fluid enters the bore 106 of the housing 100 through the pilot passage opening 150 and acts against the second axial end 146a of the first piston 128a and the first axial end 144b of the second piston 128b. The pressurized fluid causes the first piston 128a to move in a first direction and the second piston 128b to move in an opposite second direction. In the depicted embodiment, the first direction is toward the first end 102 of the housing 100 while the second direction is toward the second end 104 of the housing 100.

The first axial end 144a of the first piston 128a abuts the poppet 132a of the first check valve 124a and unseats the poppet 132a from the valve seat 134a. The second axial end 146b of the second piston 128b abuts the poppet 132b of the second check valve 124b and unseats the poppet 132b from the valve seat 134b. With the first piston 128a acting against the first check valve 124a, the first control port 48 of the fluid controller 40 is in fluid communication with the first port 26 of the actuator 24. With the second piston 128b acting against the second check valve 124b, the second control port 50 of the fluid controller 40 is in fluid communication with the second port 28 of the actuator 24. With the first and second check valves 124a, 124b unseated from the valve seats 134a, 134b, respectively, fluid from the actuator 24 is communicated to the fluid controller 40 which allows the vehicle operator to feel movement of the actuator through the steering actuation member S when the first proportional valve 42 is in the neutral position $N_1$.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A steering system for a vehicle comprising:
    a fluid pump;
    an actuator in selective fluid communication with the fluid pump;
    a hydrostatic steering system including a fluid controller having:
        a first proportional valve in fluid communication with the fluid pump;
        a fluid meter in fluid communication with the first proportional valve and the actuator;
    an electro-hydraulic steering system including:
        a second proportional valve in selective fluid communication with the fluid pump and the actuator, wherein the second proportional valve is disposed in parallel to the first proportional valve; and
        a load-reaction switching valve assembly disposed in series with the first proportional valve of the hydrostatic steering system, wherein the load-reaction switching valve assembly allows fluid communication between the actuator and the fluid controller when the first proportional valve is in a neutral position, the load-reaction switching valve assembly including:
            a housing having a first end and an oppositely disposed second end, the housing defining a bore;
            a first check valve disposed in the bore adjacent to the first end;
            a second check valve disposed in the bore adjacent to the second end;
            a first piston disposed in the bore between the first and second check valves; and
            a second piston disposed in the bore between the first piston and the second check valve.

2. The steering system of claim 1, wherein the electro-hydraulic steering system includes a mode selection valve in fluid communication with the load-reaction switching valve assembly, the mode selection valve being adapted to enable or disable a load-reaction feature of the hydrostatic steering system.

3. The steering system of claim 1, wherein the second proportional valve is hydraulically actuated.

4. The steering system of claim 1, wherein the second proportional valve is electrically actuated.

5. The steering system of claim 1, wherein the fluid controller includes a fluid inlet port in fluid communication with the fluid pump, a fluid outlet port, a first control port and a second control port, the first and second control ports being in selective fluid communication with the actuator.

6. The steering system of claim 5, wherein the housing of the load-reaction switching valve assembly defines a first control passage in fluid communication with the first control port of the fluid controller, a second control passage in fluid communication with the second control port of the fluid controller and a pilot passage in fluid communication with a mode-selection valve.

7. The steering system of claim 6, wherein the first and second pistons are actuated between a first position in which pressurized fluid in the first control passage unseats the first check valve and acts against the first piston so that the first piston abuts the second piston to unseat the second check valve, a second position in which pressurized fluid in the second control passage unseats the second check valve and acts against the second piston so that the second piston abuts the first piston to unseat the first check valve, and third position in which pressurized fluid in the pilot passage acts against the first piston to unseat the first check valve and the second piston to unseat the second check valve.

8. A steering system for a vehicle comprising:
    a fluid pump;
    an actuator in selective fluid communication with the fluid pump;
    a hydrostatic steering system including
        a fluid controller defining a fluid inlet port in fluid communication with the fluid pump, a fluid outlet, a first control port and a second control port, the first and second control ports being in fluid communication with the actuator, the fluid controller having:
            a first proportional valve in fluid communication with the fluid pump;
            a fluid meter in fluid communication with the first proportional valve and the actuator;
    an electro-hydraulic steering system including:
        a second proportional valve in fluid communication with the fluid pump and the actuator, wherein the second proportional valve is disposed in parallel to the first proportional valve; and
        a load-reaction switching valve assembly disposed in series with the first proportional valve of the hydrostatic steering system, wherein the load-reaction switching valve assembly includes:
            a housing having a first end and an oppositely disposed second end, the housing defining a bore, a first control passage in fluid communication with the first control port of the fluid controller, a second control passage in fluid communication with the second control port of the fluid controller and a pilot passage;
            a first check valve disposed in the bore adjacent to the first end;
            a second check valve disposed in the bore adjacent to the second end;
            a first piston disposed in the bore between the first and second check valves; and
            a second piston disposed in the bore between the first piston and the second check valve.

9. The steering system of claim 8, wherein the electro-hydraulic steering system includes a mode selection valve in fluid communication with the pilot passage of the load-reaction switching valve assembly.

10. The load-reaction switching valve assembly of claim 9, wherein the pilot passage is disposed between the first control passage and the second control passage in the housing of the load-reaction switching valve assembly.

11. The steering system of claim 8, wherein the second proportional valve is hydraulically actuated.

12. The steering system of claim 8, wherein the second proportional valve is electrically actuated.

13. A load-reaction switching valve assembly for a hydrostatic steering circuit comprising:

a housing having a first end and an oppositely disposed second end, the housing defining a bore, a first control passage in fluid communication with a first control port of a fluid controller, a second control passage in fluid communication with a second control port of the fluid controller and a pilot passage;

a first check valve disposed in the bore;

a second check valve disposed in the bore;

a first piston disposed in the bore between the first and second check valves; and a second piston disposed in the bore between the first piston and the second check valve.

14. The load-reaction switching valve assembly of claim 13, wherein the first and second pistons are actuated between a first position in which pressurized fluid in the first control passage unseats the first check valve and acts against the first piston so that the first piston abuts the second piston to unseat the second check valve, a second position in which pressurized fluid in the second control passage unseats the second check valve and acts against the second piston so that the second piston abuts the first piston to unseat the first check valve, and third position in which pressurized fluid in the pilot passage acts against the first piston to unseat the first check valve and the second piston to unseat the second check valve.

* * * * *